Feb. 28, 1961    H. W. BIXBY    2,973,172
RADIAL CELL DECELERATOR
Filed Sept. 16, 1957    3 Sheets-Sheet 1

INVENTOR:
Harold W. Bixby
By Hubert E. Metcalf
His Patent Attorney

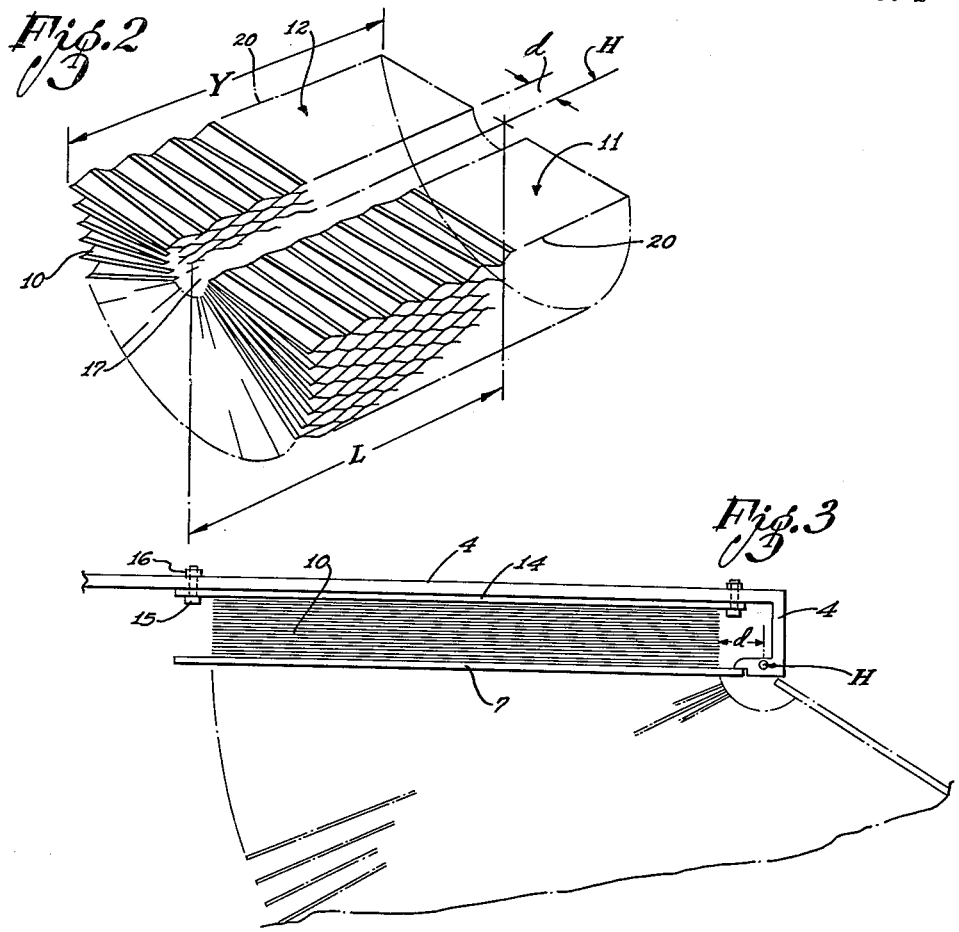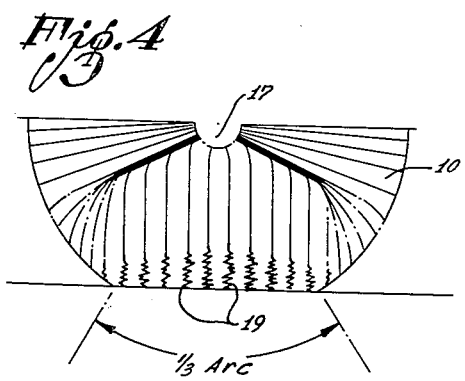

Feb. 28, 1961  H. W. BIXBY  2,973,172
RADIAL CELL DECELERATOR
Filed Sept. 16, 1957
3 Sheets-Sheet 3

INVENTOR:
Harold W. Bixby
Hubert E. Metcalf
His Patent Attorney

United States Patent Office 2,973,172
Patented Feb. 28, 1961

2,973,172

RADIAL CELL DECELERATOR

Harold W. Bixby, Encino, Calif., assignor to Northrop Corporation, a corporation of California Filed Sept. 16, 1957, Ser. No. 684,172

6 Claims. (Cl. 244—138)

The present invention relates to shock absorbers, and more particularly, to landing decelerators for articles dropped in aerial delivery systems.

One of the several necessary operations in the successful delivery of cargo from an aircraft to the ground by parachute is that a decelerating device or shock absorber must limit the landing force experienced by the cargo to within tolerable limits. This problem of absorbing the shock of landing impact remains without a satisfactory solution. Current aerial delivery systems utilize a platform upon which the cargo is secured, this platform being equipped with a parachute or parachutes, and a landing deceleration device on the lower side thereof. This assembly is flown to the drop site in as compact a condition as possible, and the parachute and decelerator are deployed when the loaded platform is dropped from the aircraft.

In this overall system, the aircraft, the load platforms, and the parachutes have been developed to the extent that their performance is dependable. Impact devices such as the felt pad and shear frame arrangement and the more recent air bag system have been developed and are partially successful. However, these systems are limited in their application, and the need for an adequate decelerator system remains.

Accordingly, it is a broad object of this invention to provide a suitable structure whose crushing characteristics are favorable to more efficient deceleration of a landing object than any presently known device or system.

In the load platforms mentioned hereinbefore, a stowage space is provided in the underside thereof for containing a decelerator device. The space in one 15-foot embodiment of platform is about six (6) inches deep, and is covered by anti-toppling doors (if used), which are released to open when the platform clears the aircraft. The stowed decelerator system is then free to extend. It is thus seen that a particularly desirable feature or requirement of a decelerator for use with a standard load platform would be that it be capable of compact storage and then deployment to an extended position for operation during landing. The latter is therefore another object of the present invention.

If high winds are present during the parachute-landing of the cargo, a suitable decelerator must present a good resistance to overturning of the platform upon ground impact. Therefore, a further object is to provide a decelerator having high energy absorption due to horizontal component of velocity, to minimize toppling.

Other important objects of this invention are to provide a decelerator having characteristics which are equal to or better than existing arrangements in matters of reliability, capability, simplicity, and safety.

With respect to the recent air bag system previously mentioned, still further objects of the present invention are to provide a decelerator which is superior in its economics, reliability, efficiency, simplicity, and weight of the total landing assembly, and which is 100% safe to use.

Briefly, my invention comprises a honeycomb cell cushion assemblage which is arranged to deploy radially from a compact space to an expanded operating position. A relatively thin unexpanded cushion of this material is preferably fastened on one side to the top of the stowage space in a load platform, and the other, lower, side is preferably secured to the inner side of a hinged cover or door forming the bottom surface of a prepared load platform. When the cover is swung open nearly 180 degrees, the honeycomb cell structure expands and shapes into a half-cylindrical pad with cell ends pointing outwardly and downwardly from the hinge line, which provides the proper decelerating force at the time of striking the ground.

This invention will be more fully understood by reference to the ensuing detailed description of a specific embodiment, together with the accompanying drawings illustrating a preferred arrangement of the same.

In the drawings,

Figure 2 is a perspective view of the basic radially expanded decelerator cushion as used in the system of Figure 1, showing the honeycomb cell structure.

Figure 3 is a partial cross sectional diagram of the load platform of Figure 1, showing a collapsed decelerator in the stowed position therein.

Figure 4 is an end view of the honeycomb cushion of Figure 2, showing it in contact with the ground plane as initial crushing occurs.

Figure 1:
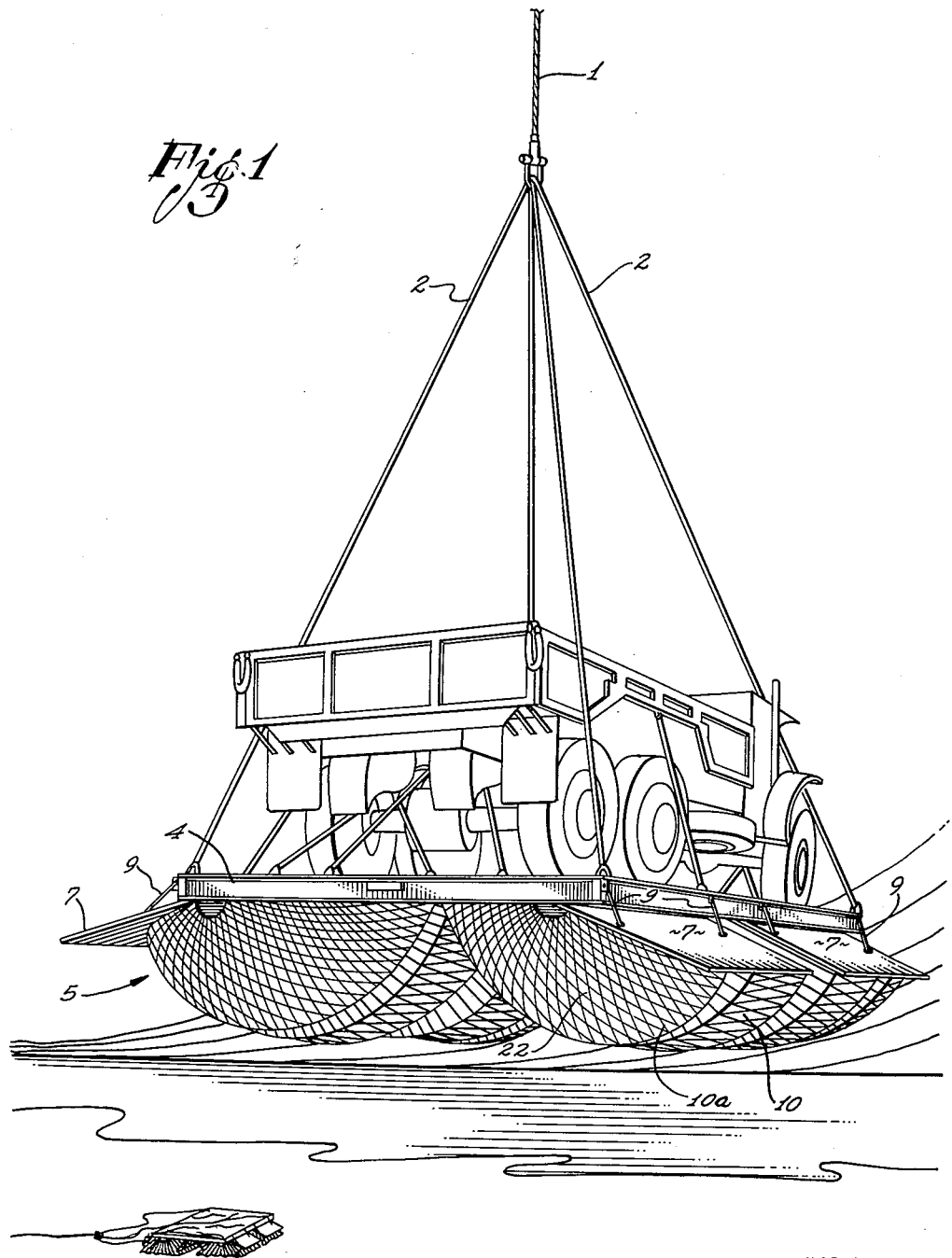
Figure 1 is a perspective view of a heavy cargo on a load platform equipped with decelerators according to the present invention, showing the attitude the units are in just before landing from a parachute delivery.

Referring first to Figure 1 for a detailed descripition of this invention, this drawing shows its manner of cooperation as a component of a typical aerial delivery apparatus. A parachute (not shown) is attached to the upper end of a main line 1, to which are joined four risers 2 in turn fastened to the corners of a load-bearing platform 4. A load, such as the truck illustrated, is anchored to the top of the platform 4, and landing shock absorber assemblies 5 are provided under the platform.

A space of about six inches, for example, is provided inside the platform structure, which is preferably closed by anti-toppling doors 7 while the packed load is being transported in the delivery aircraft, as shown in Figure 3. The doors 7 are hinged about a hinge axis H adjacent their outer edges, and open to the approximate position shown, during the parachute descent. This operation need not be described in detail herein, since the mechanism is conventional and well known, a suitable release means being described in the U.S. Patent No. 2,774,560, granted to F. B. Johnson, for example. Briefly, however, door closure latches (not shown) are released by suitable time delay devices after the load clears the aircraft, and allow spring-loaded tie cords 9 to rotate the doors 7 open approximately 180 degrees. The collapsed shock absorber devices 5 are now expanded to operating position and the load is ready to contact the ground.

The decelerator of the present invention comprises preferably a number of basic radialy expandable honeycomb cell structures 10, one of which is shown alone in Figure 2. Honeycomb structures are received in the flat state, after which one side surface 11 is bonded or otherwise attached to the inner side of one of the doors 7, and the opposite side surface 12 is bonded to a plywood panel 14, for example, as shown in Figure 3. A small distance $d$ is left between the collapsed cell ends and the hinge line H, and the collapsed cushion 10 is smaller all around than both the attached door 7 and the panel 14. After a new honeycomb structure such as this has been open for a time, it will attain a small amount of set which requires pressure to hold the assembly flat again. Therefore, when the doors 7 are opened during actual operation, the cushions will tend to push them open at the start, thus aiding the tie cords 9 when their moment arm is small. When the decelerator cushions are to be installed in the platform 4, the rim of the panel 14 is secured to the under side of the platform in any suitable manner, such as by studs 15 and nuts 16.

When the door 7 is opened, the distance $d$ results in a central hollow space 17 adjacent the hinge line as the honeycomb cells open up to the final configuration shown in Figure 2. It must be understood that the arrangement is such as to result in the longitudinal dimension of each cell being on a radial line perpendicular to the hinge axis H of the door 7 on the platform 4. This causes the open ends of the cells to be the elements which contact the ground and thus absorb the landing impact lengthwise of the cells.

These cushions 10 are preferably made of ordinary kraft paper with the cell sides thereof bonded to each other in the usual manner. Each cushion is a single unlaminated unit. Very suitable tests have been made with a honeycomb structure composed of 100 pound kraft paper (100 pounds per ream), no resin content, and having one-inch cells. By reducing the paper weight and increasing the number of cells, more than double the crushing resistance force will be enabled.

Reference is now made to Figure 4 as a basis for explaining the operation of this novel decelerator. Just after ground contact is made, air is trapped to a variable degree in each cell whose end is covered over by the ground. This causes the central region of cells, corresponding to about one-third of the total arc, to diverge from a radial direction and line up parallel with the line of force. The outer cells are forced outwardly and keep the center one-third from experiencing column buckling. As deflection increases, the cell failure due to axial compression in the characteristic accordion pleats 19 continues upwardly while maintaining a nearly constant decelerating force. Thus, about one-third of the cells are efficiently used (100% effective) to provide direct deceleration, and the remaining two-thirds stabilize the inner portion and prevent column bending failure therein.

Figure 5:
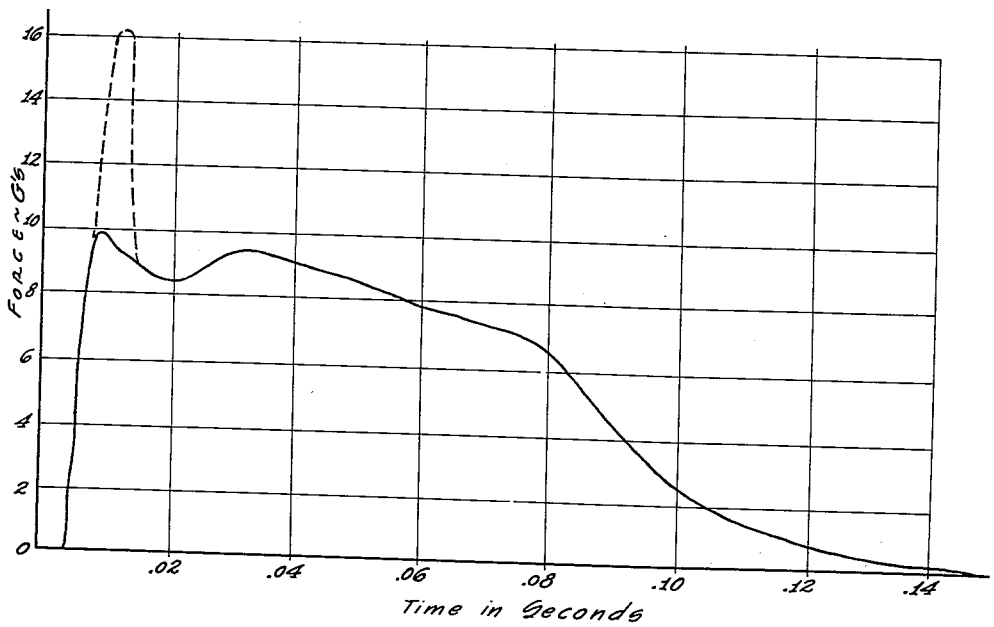
Figure 5 is a graph of deceleration versus time at the moment of landing impact of the present radially expanded cushion, illustrating its favorable characteristics.

Figure 5 shows by means of the solid-line curve the excellent force-time deceleration obtained with a test specimen having a radial thickness of 13 inches and weighted with 200 pounds when drop-tested. In comparison with a parallel-sided cell rectangular block aligned vertically, the energy absorbing capability of the present radially expanded design is less, but the working stroke of a practical system is potentially longer. Further, a definitely superior result of the radial type is that no high initial peak of deceleration is produced.

The dotted line portion of the curve in Figure 5 shows the high initial peak of acceleration produced by the parallel-sided block type shock absorber, which would exceed the maximum deceleration value that the load is capable of withstanding, unless the shock absorber were made larger to operate very inefficiently. This peak is produced by the first high resistance of the parallel walls of the cells in column bearing just before initial buckling failure occurs, followed by progressive buckling along the cell length to produce a continuous resistance at a lower average value.

Further, the uniformity or consistency of the good crushing characteristics of the radial cushion herein disclosed is very good, almost identical curves being achieved when identical cushions are tested under identical conditions.

A big difference, moreover, between the two honeycomb configurations is that no way has been found to compress the straight block type in an endwise direction into the small stowage space allotted in the load platform 4. Obviously, the radially expandable arrangement is inherently suited for this phase of the operation.

Many other advantages of the present invention over other possible types of decelerators for this purpose have been found. The cylindrical cushion 10 in Figure 2 presents crushing resistance to both vertical and lateral components of force. A spherical-section embodiment of cushion can be provided for balanced resistance in all three force directions. This will be described later. The energy absorbing properties of the radial structure enable an increase of vertical descent velocity over that of the air bag system referred to, thereby rendering a higher resistance to overturning. This higher possible descent velocity further enhances the economics of the radial cell structure by requiring smaller or a lesser number of parachutes for a given load. The most expensive single item of the decelerator systems is the parachute assembly.

Figure 6:
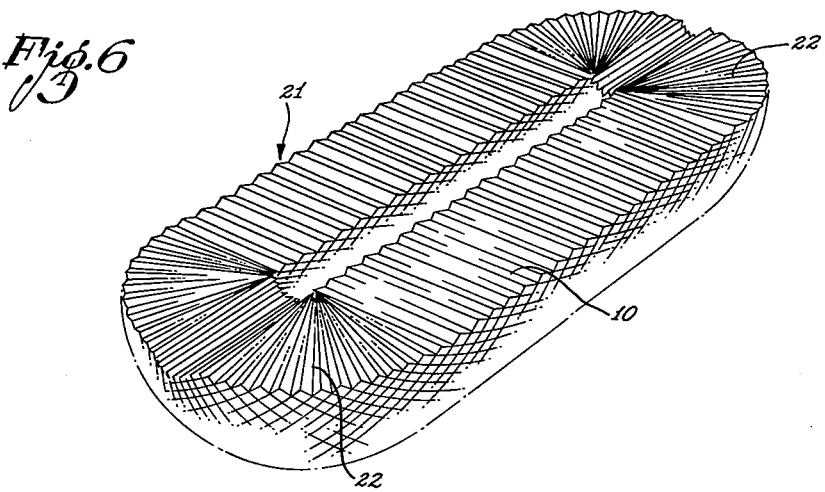
Figure 6 is a perspective view of a modified shape which can be given the present decelerator, to make it more symmetrical for ground impact during horizontal drift velocities in any direction.

Figure 6 shows a modified honeycomb cell cushion assembly 21 which comprises a central cylindrical expanded section 10 as shown in Figure 2 and two spherical end sections 22. This could be used as an ideal integral unit by itself, or with others as may be required by the particular case at hand.

As shown in the case of Figure 1, four anti-toppling doors 7 are used, each door having attached thereto one main cylindrical cushion 10, and spaced from this, an assembly of one short cylindrical cushion 10a and one spherical cushion 22 butted together. It is thus seen that this complete platform has excellent landing impact resistance in all directions, and that the basic radially expanded cushion of this invention has a substantially rectangular force-to-deflection curve in absorbing the landing shock. This shock absorber cushion is economical to manufacture, and easy to install on a landing platform or directly on a cargo store to be dropped. With all factors considered, the present radial cell construction has therefore been shown to be an improved landing decelerator over all known types now in use.

While in order to comply with the statute, the invention has been described in language more or less specific as to structural features, it is to be understood that the invention is not limited to the specific features shown, but that the means and construction herein disclosed comprise a preferred form of several modes of putting the invention into effect, and the invention is therefore claimed in any of its forms or modifications within the legitimate and valid scope of the appended claims.

What is claimed is:

1. A landing decelerator system comprising a load platform with a hinged door in the lower side thereof, a decelerator installed in a collapsed condition between said door when closed and the lower side of said platform, said decelerator comprising a honeycomb cell cushion structure with its upper face secured to said platform lower side and its lower face secured to said door, the longitudinal dimension of the cells in said cushion structure being perpendicular to the hinge line of said door, whereby when said door is opened substantially 180 degrees, said cushion cells open and form a radially expanded cellular shock absorber having open-ended cells aligned perpendicularly to the landing impact forces.

2. Apparatus in accordance with claim 1 wherein said decelerator comprises a single unlaminated paper honeycomb with zero resin content.

3. Apparatus in accordance with claim 1 wherein an edge of said cushion is adjacent to but spaced a relatively small distance from said hinge line, to facilitate proper expansion action of said cushion.

4. A landing decelerator system including a rigid load platform having upper and lower sides, a flattened honeycomb cell shock absorber with its upper surface secured to said lower side of said platform, and actuating means connected at one end to said load platform and at the other end to the lower surface of said shock absorber for rotating said lower surface downwardly and outwardly about an axis in the normally horizontal plane of said platform adjacent to one edge of said shock absorber and perpendicular to the longitudinal dimension of the cells of said shock absorber, to a radially expanded position where the open ends of said cells will progressively contact the ground and absorb the landing impact during crushing.

5. In a parachute landing system having a load platform with a stowage space in the lower side thereof, a decelerator for absorbing landing shock comprising a honeycomb cell structure, means for holding said structure in a collapsed stowed condition in said stowage space, and means for radially opening and expanding said structure about an axis perpendicular to the cells thereof and adjacent one edge of said structure, said axis being fixed in said platform at the lower side of said stowage space, both of said recited means positioning said expanded structure with the top thereof substantially level and the expanded cell ends extending generally downwardly in substantially a 180-degree arc.

6. A landing decelerator system comprising a load platform, four flattened honeycomb cell shock absorbers mounted on said platform in a rectangular arrangement with one said shock absorber at each of the four corners thereof, the upper surface of each said shock absorber being secured to the lower side of said platform, each said shock absorber having an axis of rotation in the normally horizontal plane of said platform adjacent to one edge of its respective shock absorber and perpendicular to the longitudinal dimension of the cells thereof, and means for rotating the lower surface of each said shock absorber downwardly and outwardly about its said axis to a radially expanded position where the open ends of said cells will progressively contact the ground and absorb landing impact during crushing, said axis of rotation of each said shock absorber being near an edge of said platform so that said shock absorbers extend substantially beyond said platform when in said radially expanded position.

References Cited in the file of this patent

UNITED STATES PATENTS

| | | |
|---|---|---|
| 1,809,593 | Luhrs | June 9, 1931 |
| 2,142,894 | Grigg | Jan. 3, 1939 |
| 2,457,205 | Campbell et al. | Dec. 28, 1948 |
| 2,557,105 | Hight | June 19, 1951 |
| 2,668,327 | Steele | Feb. 9, 1954 |
| 2,713,466 | Fletcher et al. | July 19, 1955 |
| 2,728,479 | Wheeler | Dec. 27, 1955 |
| 2,749,013 | Wilkinson | June 5, 1956 |
| 2,774,560 | Johnson | Dec. 18, 1956 |

OTHER REFERENCES

"This Week," Magazine Section, page 18, Feb. 24, 1957, of The Sunday Star newspaper, Washington, D.C.